(12) United States Patent
Telkamp et al.

(10) Patent No.: US 6,332,392 B1
(45) Date of Patent: Dec. 25, 2001

(54) DUAL NESTED PLUNGER TRANSFER MOLDING SYSTEM AND METHOD THEREFOR

(75) Inventors: Arnold T. M. Telkamp, Velp; Richard G. T. Fierkens, Ewijk, both of (NL)

(73) Assignee: FiTel Innovations, Heerenberg (NL)

( * ) Notice: Subject to any disclaimer, the term of this patent is extended or adjusted under 35 U.S.C. 154(b) by 0 days.

(21) Appl. No.: 09/522,818

(22) Filed: Mar. 10, 2000

(51) Int. Cl.$^7$ ............................. F01B 31/00; F01B 15/02
(52) U.S. Cl. ..................... 92/6 R; 92/117 A; 92/165 R
(58) Field of Search .................... 92/6 R, 62, 51, 92/52, 117 R, 117 A, 146, 165 R (56) References Cited

U.S. PATENT DOCUMENTS

| | | | |
|---|---|---|---|
| 2,302,873 | * 11/1942 | Lester | 92/87 |
| 2,515,956 | * 7/1950 | Greenberg | 92/52 X |
| 2,568,228 | * 9/1951 | Forse | 92/117 R |
| 2,575,190 | * 11/1951 | Sedgwick | 92/52 |
| 2,640,325 | * 6/1953 | Haller | 92/13.3 |
| 2,711,157 | * 6/1955 | Halward | 92/27 |
| 2,754,804 | * 7/1956 | Miller | 92/51 X |
| 3,193,875 | * 7/1965 | Taylor | 92/62 X |
| 3,282,049 | * 11/1966 | Benton | 92/65 X |
| 4,036,113 | * 7/1977 | Kunz | 92/111 |
| 4,242,944 | * 1/1981 | Su | 92/2 |
| 4,655,749 | * 4/1987 | Fischione | 92/51 X |
| 5,247,872 | * 9/1993 | Hoshi | 92/52 |
| 5,295,508 | * 3/1994 | Reisinger | 92/62 X |
| 5,328,347 | 7/1994 | Ten Vaarwerk . | |
| 5,366,363 | * 11/1994 | Good et al. | 425/78 |
| 5,478,226 | 12/1995 | Fierkens . | |

* cited by examiner

Primary Examiner—John E. Ryznic
(74) Attorney, Agent, or Firm—Weiss & Moy, P.C.; Jeffrey D. Moy; Harry M. Weiss (57) ABSTRACT

A dual nested plunger transfer molding system. The dual nested plunger transfer molding system, comprises: a transfer plunger having a piston chamber internally, co-axially, positioned, integral within the transfer plunger; and a co-axial plunger slidably and co-axially coupled to the piston chamber. The co-axial plunger comprises: a co-axial plunger piston end, and a co-axial plunger drive end at the opposite end from the co-axial plunger piston end. The dual nested plunger transfer molding system further comprises a piston disc coupled to the co-axial plunger drive end, the piston disc cooperating with the piston chamber to form a slidable pressure boundary within the piston chamber.

23 Claims, 7 Drawing Sheets

DUAL NESTED PLUNGER TRANSFER MOLDING SYSTEM AND METHOD THEREFOR

BACKGROUND OF THE INVENTION

1. Field of the Invention

This invention relates generally to the transfer of epoxy, or other molding plastics or materials, into mold cavities for encapsulation of devices within the mold cavity, and more specifically, to semiconductor device encapsulating equipment wherein an epoxy transfer plunger has a second plunger placed inside the epoxy transfer plunger which serves both as an epoxy quantity compensatory and as an epoxy curing-pressure transmission device, and method therefor.

2. Description of the Related Art

In a transfer molding process, such as is used for semiconductor device packaging, a plunger transfers pelletized epoxy through a canal, or runner, through a cavity opening, or gate, and into a cavity. This transfer molding process may also utilize a plurality of cavities each having its own canals, gates, etc. After a cavity is filled with the epoxy which covers the semiconductor device located therein, usually mounted on a leadframe, the pressure applied to the liquid epoxy is increased by an application of force applied by the plunger. This is done in order to achieve a desired epoxy density and also to ensure that any air in the epoxy is removed during the curing of the epoxy into a solid form.

Among the methods used for the transfer molding process are single-plunger molding, or conventional molding, in which an epoxy fill of all cavities is performed by one plunger; and multi-plunger molding in which an epoxy fill of the cavities is performed by more than one plunger. Thus, though the following discussing addresses multi-plunger molding, the discussion is also applicable to single-plunger molding and other methods known to those skilled in the art. The plungers can be driven by a variety of means of applying motive force including: hydraulic, pneumatic, mechanical, electrical or combinations thereof.

Many prior art methods of transfer molding processes used hydraulics, acting to drive the plunger(s), as the transfer motive force due to the ability to easily accommodate variable pressure controls in order to provide epoxy quantity compensation. However, more recently, the semiconductor industry has been turning away from the use of hydraulics because of the production of oil vapors from the hydraulic fluids and the associated contamination issues.

Presently, electro-mechanical based transfer drives incorporating compression springs are preferred and in general use. Typically, such a transfer drive utilizes an electro-mechanical transfer drive to supply the motive force to each and all the plungers, and each individual plunger has a pre-tensioned compression spring.

Several reasons favor such an arrangement: The epoxy pellets are subject to weight variation or in-tolerances either as supplied or due to damage. A lighter weight pellet has less epoxy material which is reflected in a lower volumetric displacement. Thus, the smaller amount of epoxy material requires adjusting the stroke of the plunger, or plungers, acting on the epoxy pellet to compensate for this reduced displacement. This displacement compensation, or distance dissipation, requirement is satisfied through the use of a compression spring coupled to each individual plunger thus enabling a single transfer drive to be used for supplying the motive force to a plurality of plungers pushing them all to an end position where each compression spring adapts, or compensates for, the precise epoxy quantity present for that specific plunger.

Additionally, in the event that any epoxy residue from a previous molding cycle used for semiconductor device encapsulation is left in the runner, or gate, blocking off the epoxy passage, a condition called gate-lock, the compression spring can compensate for the blocked runner or gate while allowing the other plungers to continue with and complete the curing phase.

Furthermore, following completion of the transfer molding process, the motive force on the plungers must be increased in order to facilitate the application of curing pressure to the epoxy located in each cavity covering its associated semiconductor device. The transfer drive compresses the springs and pushes the plungers with a higher force, which results in an increased pressure in the cavities during the epoxy curing stage.

However, the use of compression springs also has some disadvantages. For example, (1) in the event that epoxy contamination is present in the plunger cylinder, the plunger's movement will be slowed or arrested until the force built up in the compressed spring overcomes the resistance from the epoxy contamination. When the resistance is overcome, the plunger will resume movement, but now the force stored in the compressed spring will be released suddenly and added to the drive force at the input to the system. This results in a sudden acceleration of the plunger which translates into a sudden increase in the epoxy injection flowrate. Furthermore, successive areas of epoxy contamination will cause this unpredictable plunger movement to be repeated. The results of uneven and excessive epoxy flowrates can be a phenomenon known as wire sweep. Wire sweep is the breaking or bending of the gold wires connected between the semiconductor chip and leads or pins of the leadframe. Additionally, as epoxy contamination is neither predictable nor controllable this renders the transfer molding process unpredictable and non-uniform. (2) An additional disadvantage is that the displacement compensation results in a varied and unpredictable pressure at the start, during, and end of the curing phase thus resulting in varied and unpredictable curing process pressures both individually, and from cavity to cavity. (3) Yet another disadvantage is that in the event of a gate-lock, the drive has to continue its movement and compresses the compression spring over a relatively large distance which results in a relatively great force on the drive and a high pressure in the present runner while a fault situation is present.

Because of the above disadvantages, the selection of a compression spring is a compromise between addressing these three disadvantage issues and their contrary compression spring demands. The compromise is in the selection of the spring constant, the spring length and the spring pre-tension. For example, a high compression spring pre-tension is beneficial in addressing issue (1), but a high compression spring pre-tension also increases the minimum possible process pressure which may affect the curing process. In addressing the displacement compensation of issue (2), the typical spring compression distance will be small. In contrast however, the spring compression distance in the event of a gate-lock, as in issue (3), will require a much longer spring compression distance. But again, this is a compromise because a low spring constant and a long length compression spring complicates the guiding and movement of the plunger and also results in a relative long transfer drive.

Therefore a need existed for a transfer molding system that does not utilize compression springs in order to eliminate the erratic epoxy flowrates caused by epoxy contamination in combination with compression springs. Another need existed for a transfer molding system with reduced susceptibility to wire sweep. A further need existed for a transfer molding system having essentially controllable and repeatable flow and pressure values for the transfer molding process. Yet a further need existed for a transfer molding system that would not be subject to the mechanical stresses from gate-lock inherent in a transfer molding system having compression springs.

SUMMARY OF THE INVENTION

It is an object of the present invention to provide a transfer molding system that does not utilize compression springs in order to eliminate the erratic epoxy flowrates caused by epoxy contamination in combination with compression springs.

It is another object of the present invention to provide a transfer molding system with reduced susceptibility to wire sweep.

It is a further object of the invention to provide a transfer molding system having essentially controllable and repeatable flow and pressure values for the transfer molding process.

It is yet a further object of the invention to provide a transfer molding system that would not be subject to the mechanical stresses from gate-lock inherent in a transfer molding system having compression springs.

The foregoing and other objects, features, and advantages of the invention will be apparent from the following, more particular, description of the preferred embodiment of the invention, as illustrated in the accompanying drawings.

BRIEF DESCRIPTION OF THE PREFERRED EMBODIMENTS

According to one aspect of the invention, a dual nested plunger transfer molding system is disclosed. The dual nested plunger transfer molding system, comprises: a transfer plunger having a piston chamber internally and co-axially positioned, integral within the transfer plunger; and a co-axial plunger slidably and co-axially coupled to the piston chamber. The co-axial plunger comprises: a co-axial plunger piston end, and a co-axial plunger drive end at the opposite end from the co-axial plunger piston end. The dual nested plunger transfer molding system further comprises a piston disc coupled to the co-axial plunger drive end, the piston disc cooperating with the piston chamber to form a slidable pressure boundary within the piston chamber.

According to another aspect of the invention, a transfer molding system having a plurality of dual nested plungers is disclosed. The transfer molding system comprises: a plurality of transfer plungers; a plurality of piston chambers internally and co-axially, positioned, integrally within each of the plurality of transfer plungers; and a plurality of co-axial plungers slidably and co-axially coupled to each of the plurality of piston chambers. Each of the plurality of co-axial plungers comprises: a co-axial plunger piston end, and a co-axial plunger drive end at the opposite end from the co-axial plunger piston end. The transfer molding system further comprises: a plurality of piston discs coupled to each of a respective co-axial plunger drive end, each of the plurality of the piston discs cooperating with a respective piston chamber forming a slidable pressure boundary within each of the plurality of piston chambers.

According to a further aspect of the invention, a method of using a co-axial dual nested plunger for the process of transfer molding is disclosed. The method of using a co-axial dual nested plunger for the process of transfer molding comprises the steps of: providing a transfer plunger, positioning internally and co-axially a piston chamber integral to and within said transfer plunger, and providing a co-axial plunger slidably and co-axially coupled to said piston chamber. The step of providing a co-axial plunger further includes the steps of providing integral to said co-axial plunger: a co-axial plunger piston end, and a co-axial plunger drive end at the opposite end from said co-axial plunger piston end. The method of using a co-axial dual nested plunger for the process of transfer molding further comprises the step of providing a piston disc coupled to said co-axial plunger drive end, said piston disc cooperating with said piston chamber to form a slidable pressure boundary within said piston chamber.

DESCRIPTION OF THE PREFERRED EMBODIMENTS

Referring to FIGS. 1–4, a cross-sectional view of a prior art transfer plunger illustrating the effects of epoxy contamination for the epoxy flow is shown. The prior art transfer plunger system 100 comprises a mold 160, having top and bottom mold halves 160t and 160b. The mold 160 has defined within it a cavity 140, into which a leadframe 142 is placed. During the epoxy transfer process the leadframe 142 will be encapsulated with epoxy by the injection of an epoxy from epoxy pellet chamber 188.

The prior art transfer plunger system 100 further comprises a transfer plunger 120 (see FIG. 1), inserted into receiving bore 190 which is coextensive with the epoxy pellet chamber 188.

Figure 1:
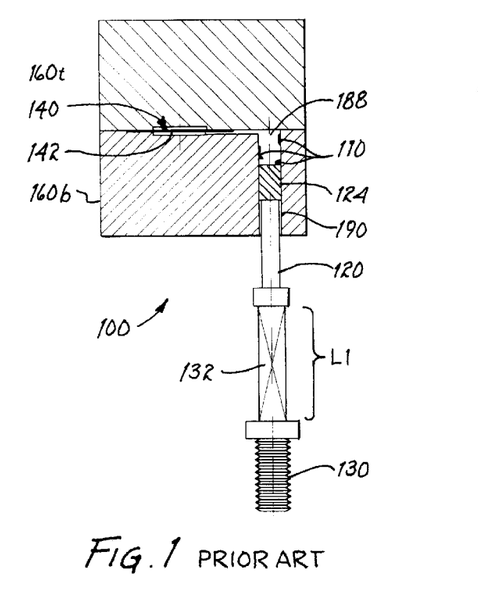
FIG. 1 is a cross-sectional view of a prior art transfer plunger method showing the influence of epoxy contamination for the epoxy flow.

The receiving bore 190 and the epoxy pellet chamber 188 are integral to the bottom mold half 160b. The transfer plunger 120 further comprises a piston 124 atop it that is a friction fit within the receiving bore 190. The transfer plunger 120 is further coupled to a drive 130 that supplies linear driving force to the transfer plunger 120 and piston 124 in order to force epoxy within the epoxy pellet chamber 188 into epoxy runner 150 and thence into the cavity 140 for encapsulating the leadframe 142 having a semiconductor device connected thereto. The transfer plunger 120 is coupled to the drive 130 by means of a compression spring 132.

As discussed in the Background section, this design, incorporating a compression spring 132 has a number of disadvantages. Referring to FIG. 1, inside the epoxy pellet chamber 188, and adhering to the walls of the epoxy pellet chamber 188 is epoxy residue 110. Epoxy contamination present in the epoxy pellet chamber 188 will cause the transfer plunger 120's movement to be slowed or arrested until the force built up in the compressed compression spring 132 overcomes the resistance from the epoxy residue 110. When the resistance is overcome, the transfer plunger 120 will resume movement, but now the force stored in the compression spring 132 will be released suddenly and added to the drive force at the transfer plunger 120. This results in a sudden acceleration of the transfer plunger 120 which directly translates into a sudden increase in the epoxy injection flowrate. Successive areas of epoxy contamination will exacerbate this problem, causing this unpredictable and uncontrollable transfer plunger 120 movement to be repeated. The results of uneven and excessive epoxy flowrates can cause the above described phenomenon known as wire sweep. Wire sweep is the breaking or bending of the relatively fragile, thin gold wires connected between the semiconductor device or chip(not shown) and leads or pins of the leadframe 142.

Figure 2:
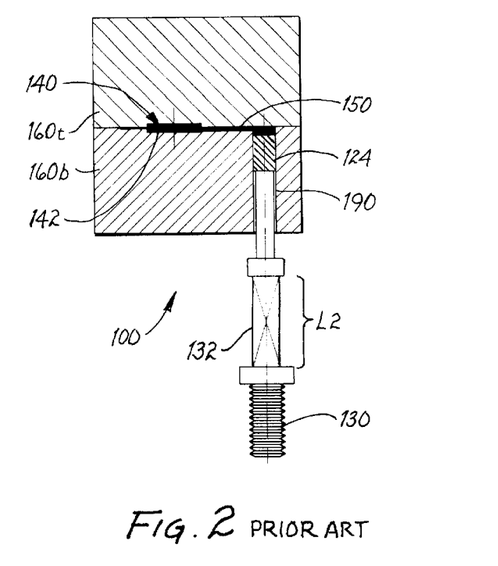
FIG. 2 is a cross-sectional view of a prior art transfer plunger method at the end of the transfer process and the start of the curing process showing the compression spring position.

Referring to FIG. 2, a cross-sectional view of the prior art transfer plunger method at the end of the epoxy transfer process and the start of the epoxy curing process is shown.

Figure 3:
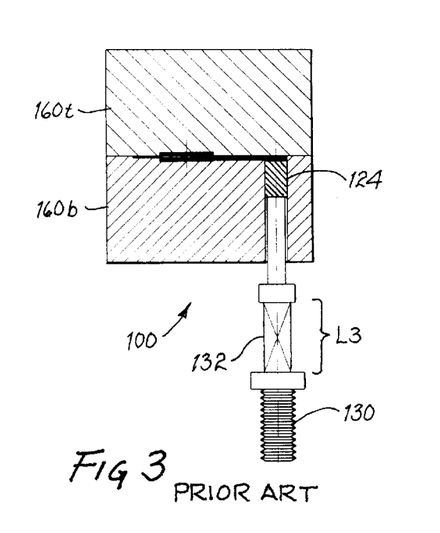
FIG. 3 is a cross-sectional view of a prior art transfer plunger method at the end of the curing process showing the compression spring position.

During the curing process, the drive 130 applies additional force upon the transfer plunger 120 compressing the compression spring 132. Referring to FIG. 1, at the start of the epoxy transfer process, the compression spring 132 is at a length L1, and at the start of the curing process, (FIG. 2), the compression spring 132 has been compressed to a length L2 during the epoxy transfer process. Referring to FIG. 3, a cross-sectional view of the prior art transfer plunger method at the end of the curing process is shown. It can be seen that the compression spring 132 is now at a length L3. As shown, L3<L2<L1, thus indicating the increased force that the compression spring 132 is under, and the increased force that the epoxy is subjected to during the curing process.

Figure 4:
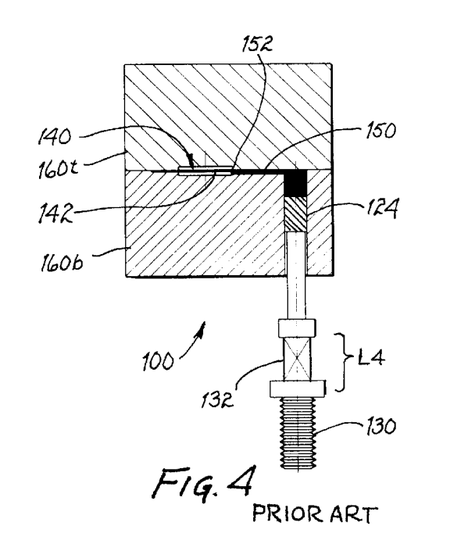
FIG. 4 is a cross-sectional view of a prior art transfer plunger method at the end of the process and a gate-lock occurrence showing the compression spring position.

As previously discussed in the Background section, an additional undesired condition that may occur is known as gate-lock. Referring to FIG. 4, if epoxy residue from a previous molding cycle is left in the runner 150 or gate area 152 blocking off the passage of epoxy, a condition called gate-lock occurs. A gate-lock condition results in the leadframe 142 remaining un-encapsulated which results in wasted unprotected or encapsulated product. During a gate-lock occurrence, the compression spring 132 can compensate for the condition of a blocked runner 150 or blocked gate 152 while allowing additional transfer plungers (not shown) to continue with and complete the transfer molding process as all of the transfer plungers are driven by a common drive 130. However, this does result in a high degree of compression to the compression spring 132 as shown by the further compression in FIG. 4 of the compression spring 132 to length L4.

Figure 5:
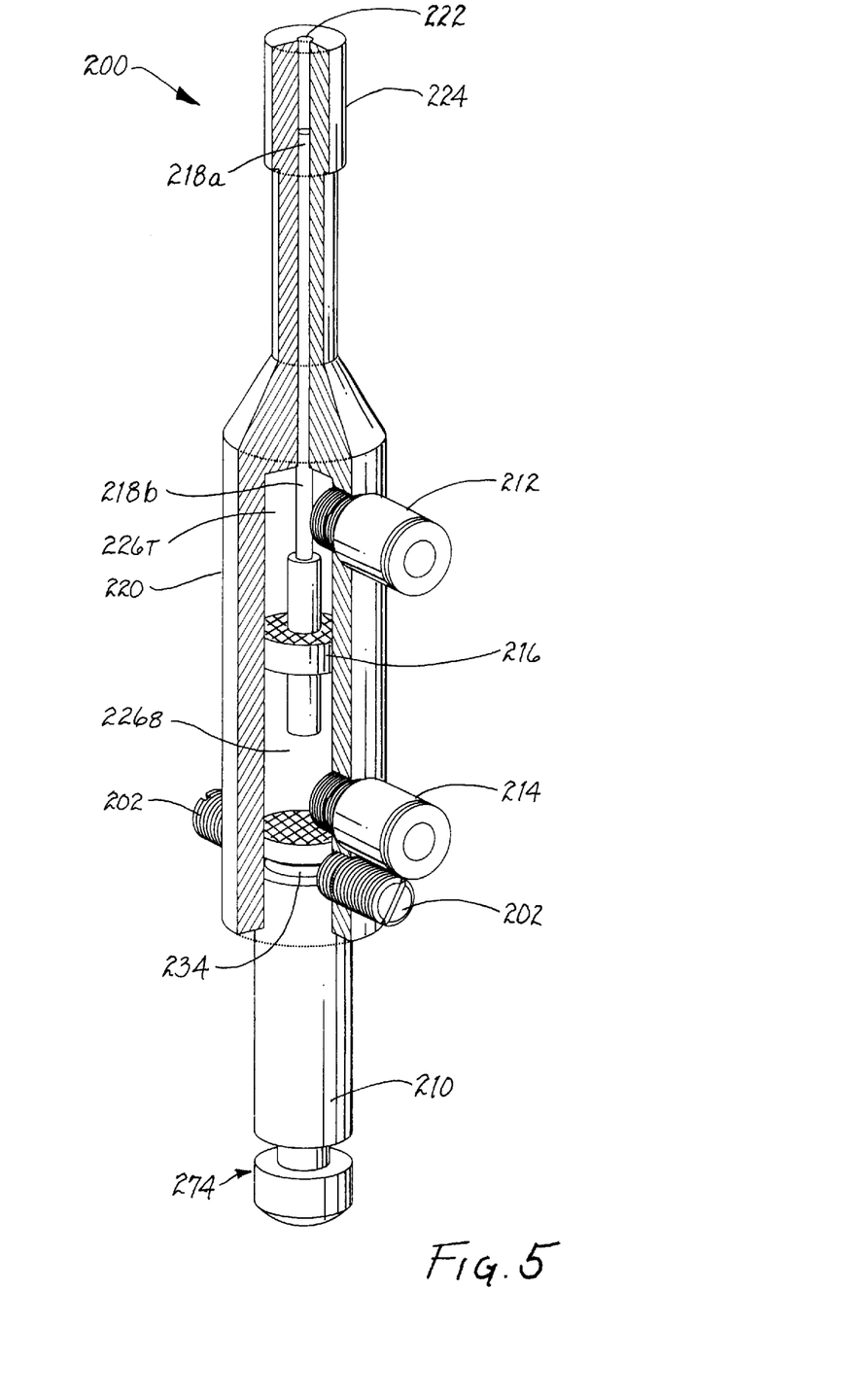
FIG. 5 is a perspective cutaway view of a preferred embodiment dual plunger module of the present invention.

Referring to FIG. 5, wherein like numerals represent like elements as used in FIGS. 1–4, except that the like numerals start with the number 2 instead of 1, a perspective cut-away view of a dual plunger module 200 representing a preferred embodiment of the present invention is shown. The dual plunger module 200 of the present invention comprises a transfer plunger 220. The transfer plunger 220 comprises a transfer plunger piston 224, and a second internal co-axial plunger 218. The transfer plunger piston 224 slides within the epoxy pellet chamber 288 (See FIG. 6.) The co-axial plunger 218 has a co-axial plunger piston end 218a, and a co-axial plunger drive end 218b. The co-axial plunger drive end 218b rides within a piston chamber 226, that has an upper and lower chamber 226t and 226b respectively. The co-axial plunger drive end 218b comprises a piston disc 216 positioned about the co-axial plunger drive end 218b that forms a slidable pressure boundary within the piston chamber 226. Coupled to the piston chamber 226 are fluid couplings 212 and 214. Each fluid coupling directs the inlet and outlet of fluids, pneumatic or hydraulic, to push the co-axial plunger 218 within the piston chamber 226 by acting upon the piston disc 216.

The co-axial plunger 218 of the present invention is particularly advantageous due to the ability to easily control the pressure applied to the piston disc 216, and thus easily control the force exerted by the co-axial plunger piston end 218a. The small surface area of the co-axial plunger piston end 218a within the co-axial plunger piston chamber 222 provides a piston and cylinder combination having substantially no affect from epoxy contamination. Thus, the process pressure for the curing process is substantially constant and consistent at all times.

The dual plunger module 200 of the present invention further comprises plunger stud 210. The plunger stud 210 is slidably coupled into the lower end of the transfer plunger 220 to allow the plunger stud 210 to insert into the transfer plunger 220 during a gate-lock occurrence. The plunger stud 210 is held in place during non-gate-lock conditions by ball locks 202 which lock into the plunger stud drive retention groove 234.

If during epoxy transfer, a gate-lock condition occurs, the drive force on the plunger stud 210 will exceed the coupling force of the engagement between the ball locks 202 and the plunger stud drive retention groove 234. Once the coupling between the ball locks 202 and the plunger stud drive retention groove 234 is severed, the plunger stud 210 will insert into the body of the transfer plunger 220 thus relieving fault condition forces on the plunger drive yoke 270, the drive 230, and associated components (not shown).

Figure 6:
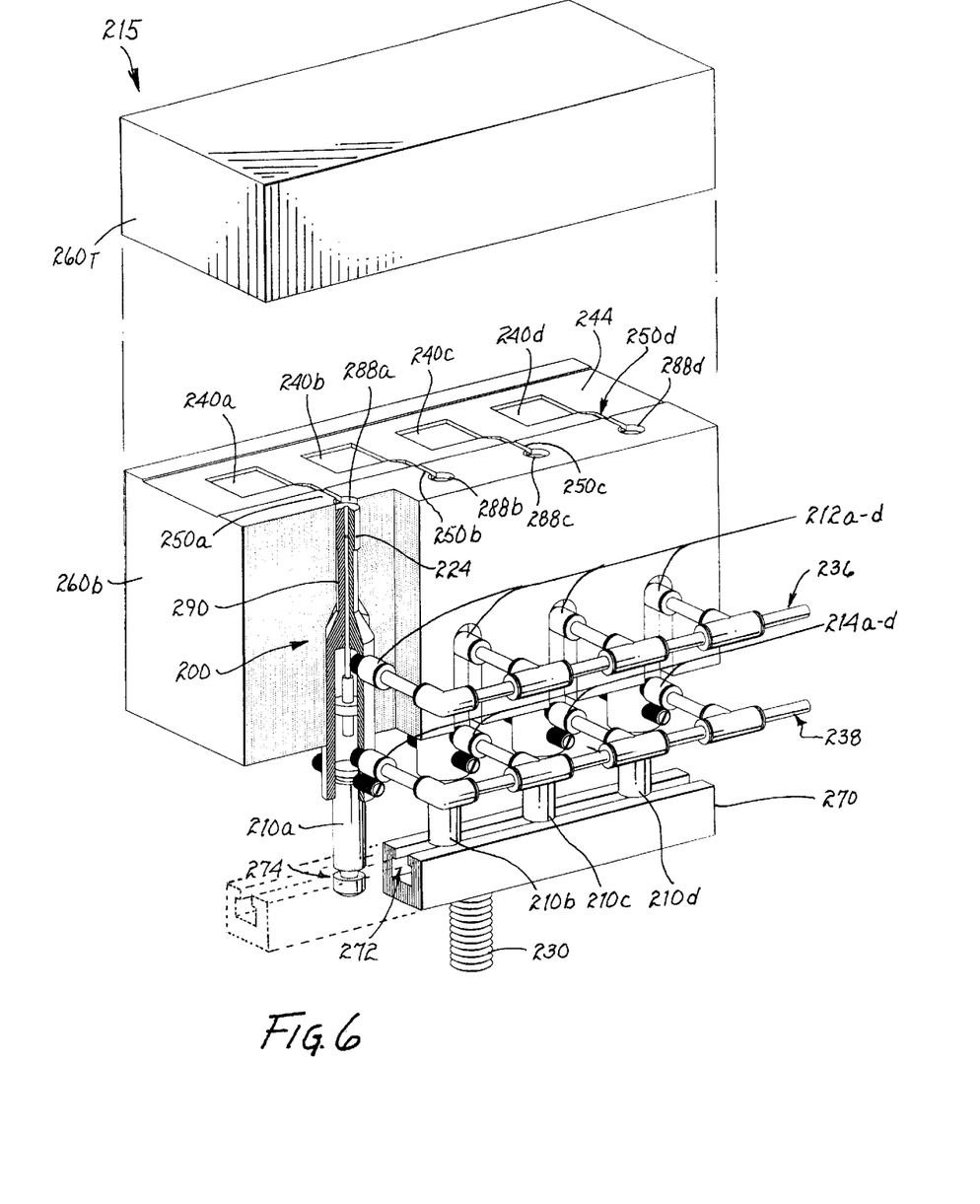
FIG. 6 is a perspective cutaway view of a plurality of dual plungers inside a mold atop a drive unit of the present invention.

Referring to FIG. 6, a perspective cutaway view of an exemplary embodiment of the present invention having a plurality of dual plunger modules 200 integral to a bottom mold half 260b atop a drive unit 230 is shown (the "system 215" hereinafter). The exemplary embodiment incorporates four dual plunger modules each being substantially identical to dual plunger module 200. Those skilled in the art will recognize that fewer or greater than four dual plunger modules 200 may be used in alternative embodiments without departing from the scope or spirit of the present invention. It should also be noted that even though only one dual plunger module 200 is visible, the remaining dual plunger modules are implicit in FIG. 6.

The system 215 comprises a mold 260, having top and bottom mold halves 260t and 260b. The mold 260 has within it, integral to the top and bottom mold half 260t and 260b adjoining surfaces, a leadframe receiving slot 244. The leadframe receiving slot 244 comprises a plurality of cavities 240a–d into which a series of devices (not shown in FIG. 6) attached to the leadframe, are positioned for encapsulation. During the epoxy transfer process the leadframe and its devices will be encapsulated by the injection of an epoxy from the epoxy pellet chambers 288a–d.

Each of the dual plunger modules 200 is inserted into a respective receiving bore substantially identical to receiving bore 290. The receiving bore 290 is coextensive to its epoxy pellet chamber 288a, as is each of the remaining receiving bores of the system 215. Each receiving bores and the epoxy pellet chambers 288a–d are integral to the bottom mold half 260b. The dual plunger module 200 further comprises a piston 224, atop it that is a friction fit within the receiving bore 290. Again, this arrangement is repeated for the remaining dual plunger modules and receiving bores.

The dual plunger module 200 is further coupled to a drive 230 that supplies linear driving force to the dual plunger module 200 and piston 224 in order to force epoxy (not shown) within the epoxy pellet chamber 288a into the epoxy runner 250a and thence into the cavity 240a for encapsulating the leadframe device therein. Again, this arrangement is repeated for the remaining dual plunger modules, receiving bores, epoxy pellet chambers 288b–d, and epoxy runners 250b–d.

Each of the dual plunger modules is coupled to the drive 230 through plunger studs 210a–d. Integral to the lower end of plunger stud 210a is a coupling ferrule 274, that slides into and couples within the C-channel 270, that is in turn coupled to and driven by drive unit 230. Each of the dual plunger modules is coupled via its respective plunger stud 210a–d, coupling ferrule, to the C-channel 270.

Each of the dual plunger modules also comprises fluid couplings 212a–d and 214a–d for the inlet and outlet of fluids. As discussed previously, this enables each of the dual plunger modules to be driven by fluids, pneumatic or hydraulic, to drive each dual plunger module co-axial plunger within its piston chamber. Again, each dual plunger module is substantially identical to the illustrated dual plunger module 200, including the co-axial plunger 218 within the piston chamber 226, and the piston disc 216.

Each of the fluid couplings 212a–d and 214a–d are coupled to fluid manifolds 236 and 238 that are in turn flexibly coupled to fluid control sources (not shown herein). The flexible coupling provides for the movement of the dual plunger modules within the bottom mold half 260b.

Operation

Figure 7:
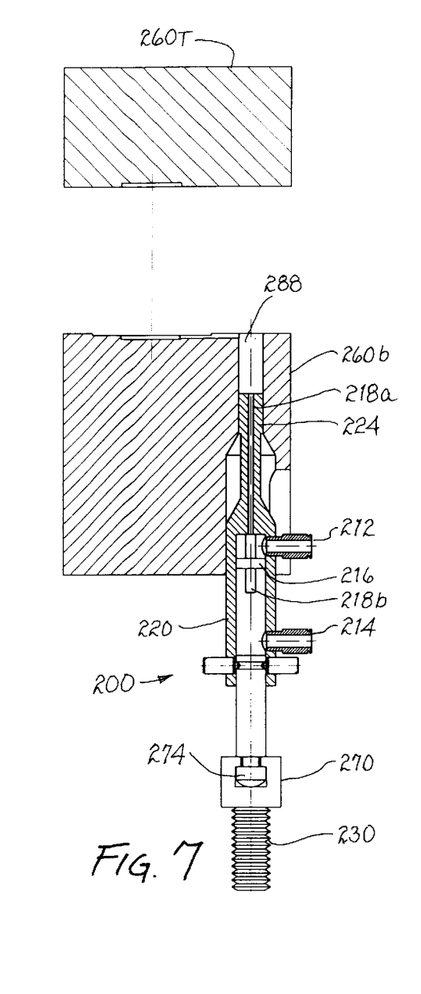
FIG. 7 is a cross-sectional view of the dual plunger module of the present invention at its starting position.

Referring to FIGS. 7–14, the operation of the dual plunger piston module 200 of the present invention is as follows. Referring first to FIG. 7, an end cross-sectional view of a dual plunger module 200 is shown. It is noted that each of the dual plunger modules are substantially identical to the dual plunger module 200, and therefore this explanation is applicable to the other three dual plunger modules not shown in FIGS. 7–18.

Referring to FIG. 7, the dual plunger module 200 is shown at the start of a process cycle. The mold 260, is in its open position. i.e. the top and bottom mold halves 260t and 260b are separated. The transfer plunger 220 is positioned at its lowest position by the drive 230. The co-axial plunger 218 is positioned by the fluid pressure provided via the fluid couplings 212 and 214 to position the top of the co-axial plunger piston end 218a flush with the top of the transfer plunger piston 224.

Figure 8:
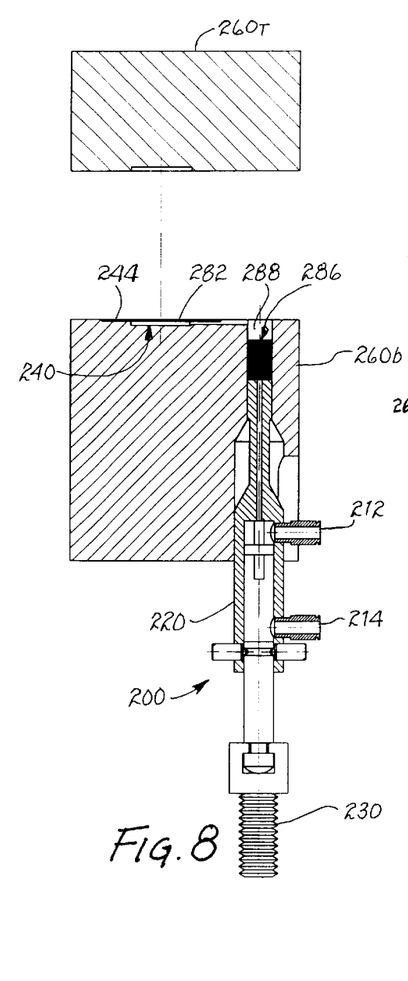
FIG. 8 is a cross-sectional view of a dual plunger module of the present invention at the start of a process cycle where pellets plus leadframe are loaded into the mold assembly.

Referring to FIG. 8, an epoxy pellet 286 has been placed into the epoxy pellet chamber 288. Those skilled in the art will appreciate that even though epoxy is discussed and utilized herein, other materials are also suitable for use with encapsulation and a plunger transfer method. Therefore, the use of epoxy herein is not meant to limit the spirit or scope of the present invention. Referring further to FIG. 8, a leadframe and device 242 to be encapsulated has been placed into the leadframe receiving slot 244. The co-axial plunger 218 is maintained in the previous position with the top of the co-axial plunger piston end 218a flush with the top of the transfer plunger piston 224.

Figure 9:
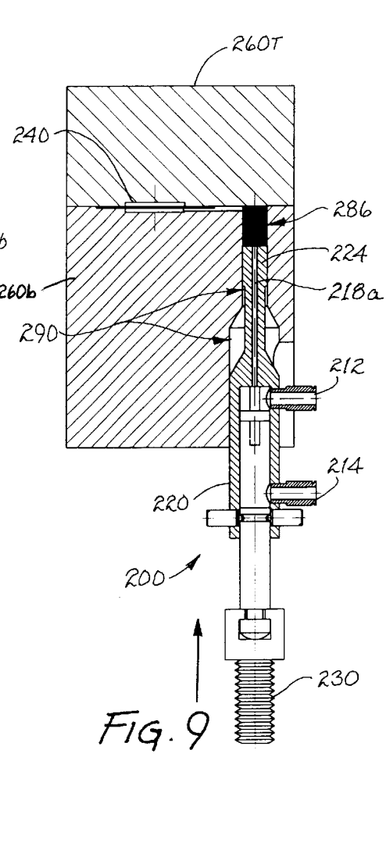
FIG. 9 is a cross-sectional view of the dual plunger module of the present invention at the start of the transfer process showing the drive moving upwards.

Referring to FIG. 9, in this Figure of an end cross sectional view of the dual plunger module 200, the top mold half 260t has been lowered and brought into contact with the bottom half mold 260b, enclosing the leadframe and device 242. Following the mating of the top and bottom mold half 260t and 260b adjoining surfaces, the transfer plunger 220 has been moved upwards in the receiving bore 290 moving the epoxy pellet 286 to the top of the epoxy pellet chamber 288. The movement of the transfer plunger 220 is accomplished via movement of the drive 230. The co-axial plunger 218 is still maintained in the previous position with the top of the co-axial plunger piston end 218a flush with the top of the transfer plunger piston 224.

Figure 10:
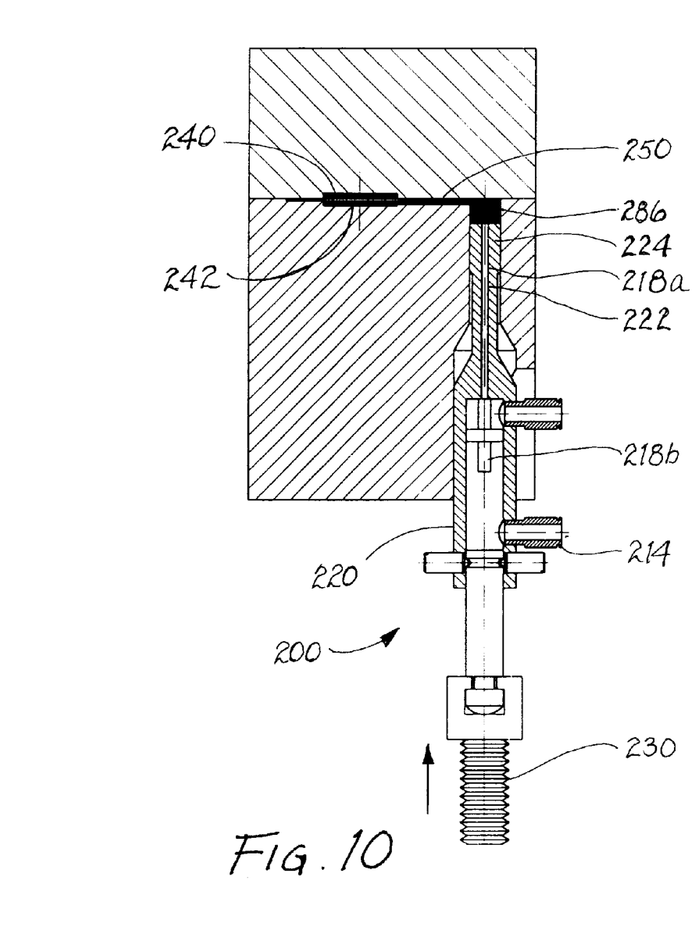
FIG. 10 is a cross-sectional view of the dual plunger module of the present invention at the position showing the cavity filled with the drive moving upwards.

Referring to FIG. 10, the drive 230 is pushing the transfer plunger 220 upwards, resulting in the transfer plunger piston 224 transferring epoxy pellet 286 material through the epoxy runner 250 and into the cavity 240, where the epoxy material surrounds and encapsulates the leadframe and device 242. The co-axial plunger 218 has been maintained in the previous position with the top of the co-axial plunger piston end 218a flush with the top of the transfer plunger piston 224.

Figure 11:
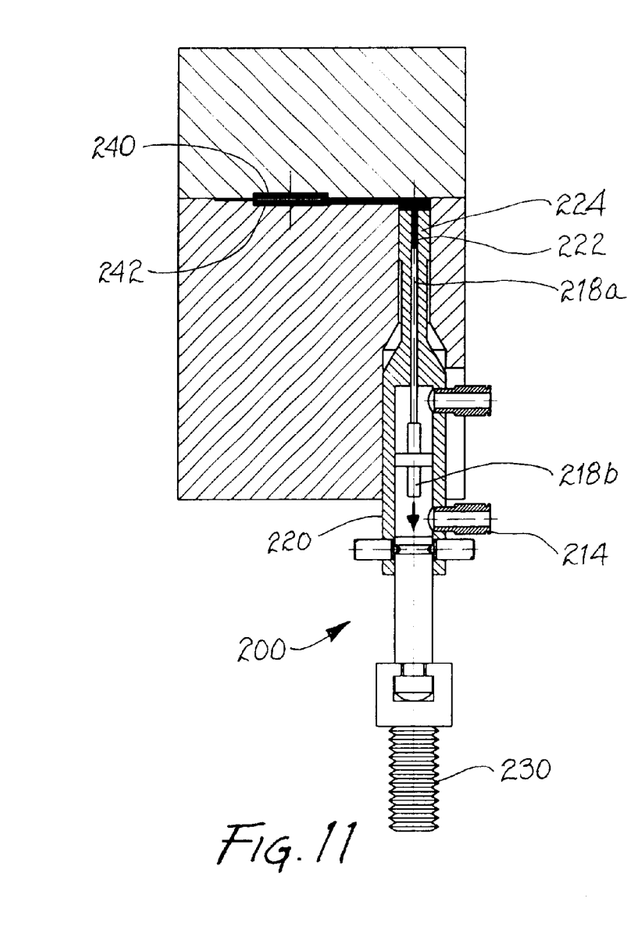
FIG. 11 is a cross-sectional view of the dual plunger module of the present invention at the end of the transfer process with the drive at the maximum travel position.

Referring to FIG. 11, the drive 230 has completed pushing the transfer plunger 220 upwards and has stopped. The cavity 240 filled prior to the transfer plunger 220 stopping its movement. To accommodate the volume of the epoxy pellet 286, the co-axial plunger piston end 218a has recessed into the co-axial plunger piston chamber 222, itself within the transfer plunger piston 224. The co-axial plunger piston end 218a recessed into the co-axial plunger piston chamber 222 because the fluid pressure supplied through the fluid coupling 214 has been exceeded by the pressure atop the co-axial plunger piston end 218a from the epoxy pellet 286 material.

Figure 12:
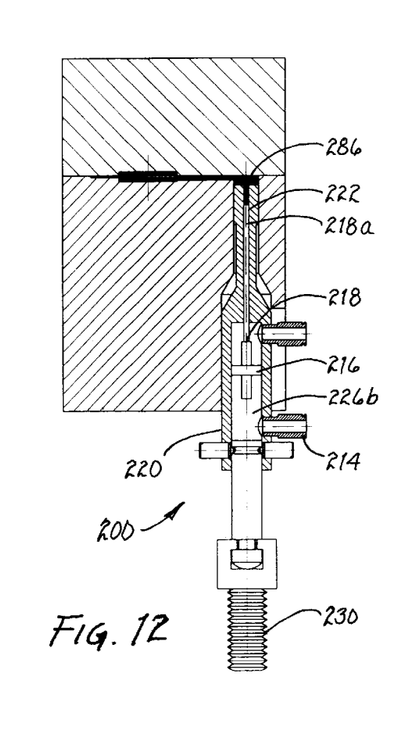
FIG. 12 is a cross-sectional view of the dual plunger module of the present invention at the end of the curing process with the main plunger still at the maximum travel position, and the slave plunger inserted further into the slave plunger chamber.

Referring to FIG. 12, the drive 230 has maintained its position, holding the transfer plunger 220 at its maximum travel position. The fluid coupling 214 is supplying a higher fluid pressure to the piston chamber 226b (external fluid control source not shown herein), thus increasing the force on the piston disc 216. This causes the co-axial plunger 218 to be driven upwards into the co-axial plunger piston chamber 222. The co-axial plunger piston end 218a moves upward compressing the epoxy material from the epoxy pellet 286 during curing.

Figure 13:
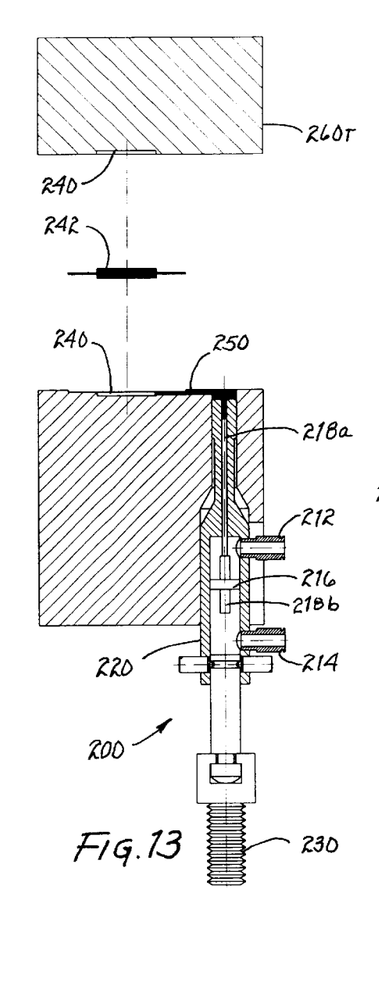
FIG. 13 is a cross-sectional view of the dual plunger module of the present invention following the curing process showing the mold open.

Referring to FIG. 13, the position of the dual plunger module 200 and its internal co-axial plunger 218 are held constant by the drive 230 and a fluid lock upon the piston disc 216 via the fluid couplings 212 and 214. Following curing of the epoxy within the cavity 240, the top mold half 260t is lifted as shown. The leadframe with the device 242 is then removed from the cavity 240 of the mold 260. The epoxy residue 241 remains in the epoxy runner 250.

Figure 14:
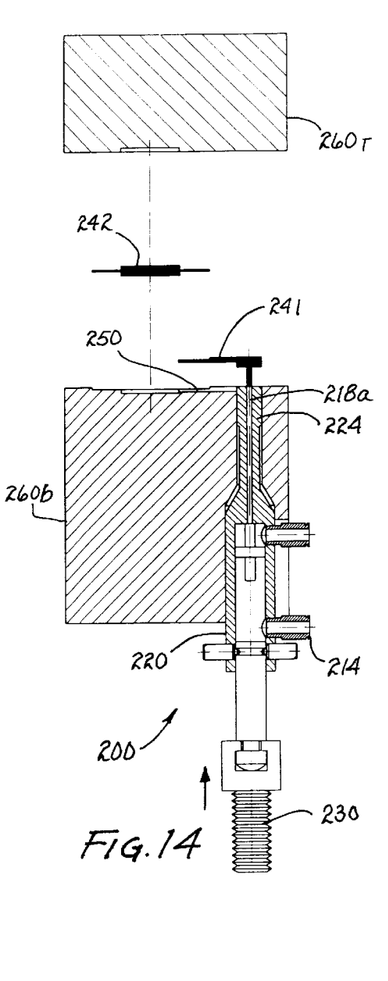
FIG. 14 is a cross-sectional view of the dual plunger module of the present invention following the curing process showing the mold open, and the main and slave plungers inserted to the full amount for waste removal.

Referring to FIG. 14, Following the removal of the leadframe and device 242, the fluid pressure from the fluid coupling 214 is increased to position the co-axial plunger piston end 218a flush with the top of the transfer plunger piston 224. At substantially the same time, the drive 230 inserts the transfer plunger 220 further into the receiving bore 290 until the top of the transfer plunger piston 224 is flush with the upper surface of the bottom mold half 260b. The action of the transfer plunger piston 224 and the co-axial plunger piston end 218a pushes, or ejects, the epoxy residue 241 from the epoxy runner 250. The epoxy residue 241 may now be removed and the dual plunger module 200 is now at the end of its process cycle.

Figure 15:
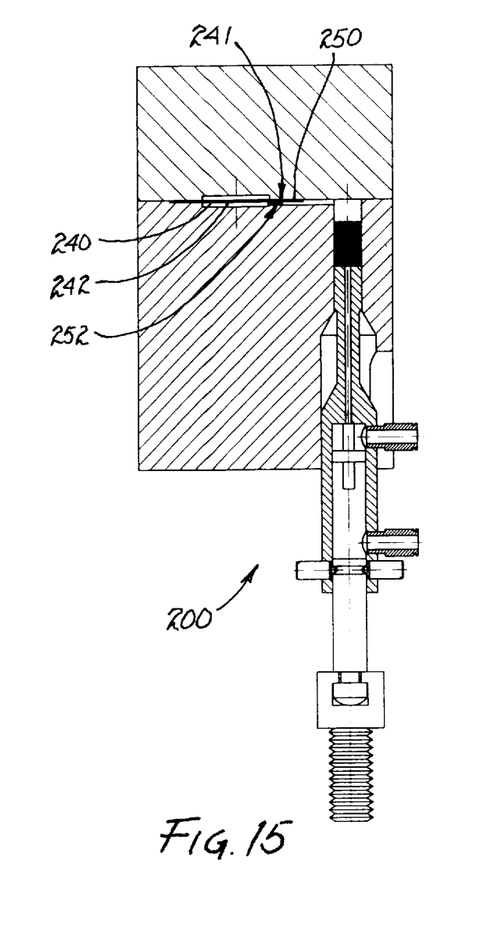
FIG. 15 is a cross-sectional view of a dual plunger module of the present invention at the start of a process cycle where pellets plus leadframe are loaded into the mold assembly, the main plunger is starting its insertion, but an epoxy remainder is present in the runner area of the mold.

Referring to FIG. 15, a precursor to a gate lock condition is shown. A piece of epoxy residue 241 has been left in the cavity gate area 252. The epoxy residue 241 will block the flow of epoxy down the epoxy runner 250 and prevent the epoxy flow from flowing into the cavity 240. This will result in the device 242 failing to become encapsulated. This will result in that device 242 becoming scrap due to this process error.

Figure 16:
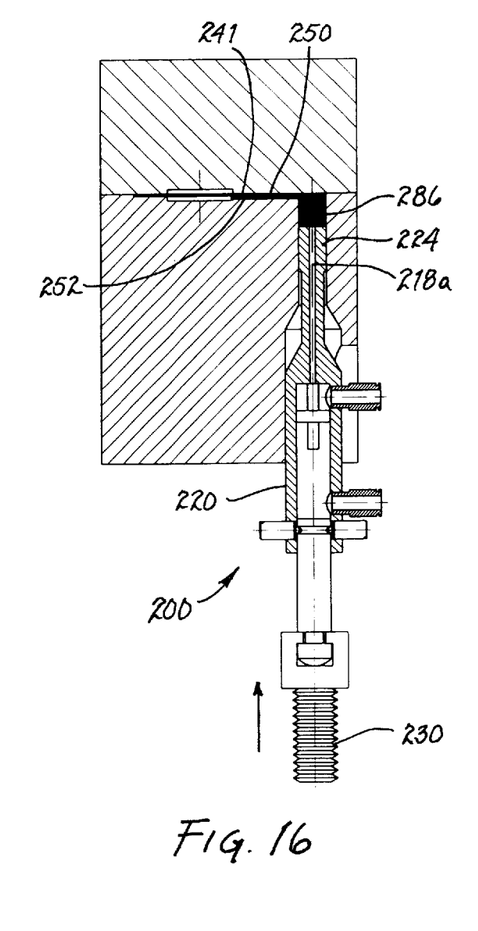
FIG. 16 is a cross-sectional view of the dual plunger module of the present invention showing the main plunger inserted, with the runner filled, but with a gate-lock occurrence due to the epoxy residue.
Figure 17:
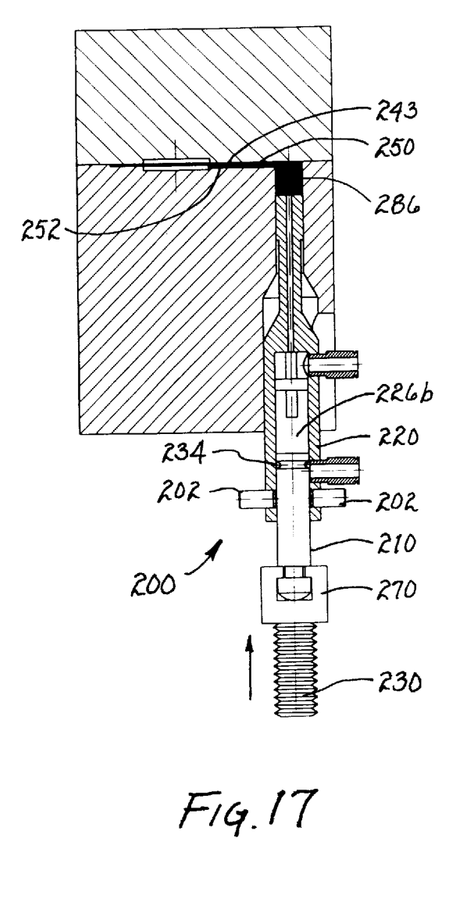
FIG. 17 is a cross-sectional view of the dual plunger module of the present invention showing a gate-lock occurrence due to the epoxy residue and the ensuing position in the disconnection of the plunger stud due to the gate lock.

Referring to FIG. 16 and 17, the consequences of a gate-lock occurrence are explained. FIG. 16 shows that the transfer plunger 220 has been moved upwards in the receiving bore 290 moving the epoxy pellet 286 to the top of the epoxy pellet chamber 288. The co-axial plunger 218 is maintained in a position with the top of the co-axial plunger piston end 218a flush with the top of the transfer plunger piston 224. The drive 230 is moving upwards, driving the transfer plunger 220 upwards to an attempt to transfer epoxy pellet 286 material through the epoxy runner 250 and into the cavity 240, where the epoxy material would surround and encapsulate the device 242. However, due to the epoxy residue 241 causing a gate-lock occurrence at the cavity gate area 252, the epoxy pellet 286 flow will be blocked at the cavity gate area 252. This will result in a build-up of force within the mold 260 and the transfer plunger 220 as the drive 230 attempts to complete its programmed upward motion.

Referring to FIG. 17, it is shown that due to the gate-lock condition, the drive force on the plunger stud 210 has exceeded the coupling force of the engagement between the ball locks 202 and the plunger stud drive retention groove 234. Therefore, the coupling between the ball locks 202 and the plunger stud drive retention groove 234 has been severed, allowing the plunger stud 210 to insert into the body, or piston chamber 226b, of the transfer plunger 220 thus relieving fault condition forces on the plunger drive yoke 270, the drive 230, and associated components, etc. The release of the gate-lock fault pressure upon the yoke 270 thus allows remaining transfer plungers 220 (See FIG. 6.) to complete their process as the yoke 270 continues its movement.

It should be noted, as those well skilled the art will appreciate, that even though the foregoing referenced vertical movements within the present invention, this is solely to provide relational functional descriptions and that the present invention may be utilized and function horizontally, inverted, at an angle, etc. Additionally, although the present invention has been described and applied to epoxy encapsulation within the semiconductor packaging field, it is particularly applicable to any controlled injection process requiring controlled pressures, plunger movements, etc. Thus, those skilled in the art will recognize the importance of the dual, or multiple, plunger concept.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. Dual nested plunger transfer molding system, comprising, in combination:
   a transfer plunger;
   a piston chamber internally and co-axially positioned integral within said transfer plunger;
   a co-axial plunger slidably and co-axially coupled to said piston chamber, said co-axial plunger comprising:
   a co-axial plunger piston end;
   a co-axial plunger drive end at the opposite end from said co-axial plunger piston end; and
   a piston disc coupled to said co-axial plunger drive end, said piston disc cooperating with said piston chamber to form a slidable pressure boundary within said piston chamber.

2. The dual nested plunger of claim 1 further comprising a first fluid coupling coupled to said piston chamber.

3. The dual nested plunger of claim 2 further comprising a second fluid coupling coupled to said piston chamber.

4. The dual nested plunger of claim 1 further comprising a second fluid coupling coupled to said piston chamber.

5. The dual nested plunger of claim 1 further comprising a co-axial plunger piston chamber internally, co-axially, positioned, integral within said transfer plunger, and co-axially coupled to said piston chamber.

6. The dual nested plunger of claim 5 wherein said co-axial plunger piston end is slidably inserted into said co-axial plunger piston chamber.

7. The dual nested plunger of claim 1 further comprising a plunger drive stud disengagably and slidably coupled within an end of said piston chamber opposite from said co-axial plunger piston chamber.

8. The dual nested plunger of claim 7 further comprising disengagable locking means for disengagably connecting and holding said plunger drive stud to said end of said piston chamber.

9. A transfer molding system having a plurality of dual nested plungers, comprising, in combination:
   a plurality of transfer plungers;
   a plurality of piston chambers internally and co-axially positioned, integrally within each of said plurality of transfer plungers;

a plurality of co-axial plungers slidably and co-axially coupled to each of said plurality of piston chambers, each of said plurality of co-axial plungers comprising:
a co-axial plunger piston end;
a co-axial plunger drive end at the opposite end from said co-axial plunger piston end; and
a plurality of piston disc coupled to each of said co-axial plunger drive ends, each of said plurality of piston discs cooperating respectively with each of said plurality of piston chambers forming a slidable pressure boundary within said respective each said plurality of piston chambers.

10. The system of claim 9 further comprising a plurality of first fluid couplings coupled respectively to each of said plurality of piston chambers.

11. The system of claim 10 further comprising a plurality of second fluid couplings coupled respectively to each of said plurality of piston chambers.

12. The system of claim 9 further comprising a plurality of second fluid couplings coupled individually and respectively to each of said plurality of piston chambers.

13. The system of claim 9 further comprising a plurality of co-axial plunger piston chambers: internally, co-axially, positioned, integral within each of said plurality of transfer plungers; and co-axially coupled to each of said plurality of piston chambers.

14. The system of claim 13 wherein each of said co-axial plunger piston ends is slidably inserted into a respective each one of said plurality of co-axial plunger piston chambers.

15. The system of claim 9 further comprising a plurality of plunger drive studs each being disengagably coupled respectively within an end of said each of said plurality of piston chambers.

16. The system of claim 15 further comprising a plurality of disengagable locking means for disengagably connecting and holding each of said plurality of said plunger drive studs to said end of said each of said plurality of piston chambers.

17. A method of using a co-axial dual nested plunger for the process of transfer molding, comprising the steps of:
providing a transfer plunger;
positioning internally and co-axially a piston chamber integral to and within said transfer plunger;
providing a co-axial plunger slidably and co-axially coupled to said piston chamber, and further providing integral to said co-axial plunger:
a co-axial plunger piston end;
a co-axial plunger drive end at the opposite end from said co-axial plunger piston end; and
providing a piston disc coupled to said co-axial plunger drive end, said piston disc cooperating with said piston chamber to form a slidable pressure boundary within said piston chamber.

18. The method of claim 17 further comprising the step of providing a first fluid coupling coupled to said piston chamber.

19. The method of claim 18 further comprising the step of providing a second fluid coupling coupled to said piston chamber.

20. The method of claim 17 further comprising the step of providing a co-axial plunger piston chamber internally, co-axially, positioned, integral within said transfer plunger, and co-axially coupled to said piston chamber.

21. The method of claim 20 further comprising the step of slidably placing said co-axial plunger piston end into said co-axial plunger piston chamber.

22. The method of claim 17 further comprising the step of providing a plunger drive stud disengagably and slidably coupled within an end of said piston chamber opposite from said co-axial plunger piston chamber.

23. The method of claim 22 further comprising the step of providing disengagable locking means for disengagably connecting and holding said plunger drive stud to said end of said piston chamber.

* * * * *